3,430,641
METHOD OF REDISPERSING DEPOSITS
Theodore R. Newman, Oak Lawn, Ill., assignor to Nalco Chemical Company, Chicago, Ill., a corporation of Delaware
No Drawing. Filed Feb. 16, 1966, Ser. No. 527,766
U.S. Cl. 134—22                          9 Claims
Int. Cl. B08b 3/08, 9/00

The present invention is directed to a process of redispersing deposits loosely adherent to solid surfaces. More specifically, the instant invention is concerned with a method of redispersing into aqueous systems deposits made up of non-bonded particulate matter in loosely attached contact with solid surfaces such as ship ballast tanks and interior surfaces of once-through cooling water systems.

There are a substantial number of commercial operations wherein it is important to clean or redisperse into water deposits in loose contact with solid surfaces forming a part of such operations. In the most advantageous situation, solids found in aqueous systems in a suspended or dispersed state are maintained in said dispersed state during functioning of the system. However, in many instances chemical additives used to maintain the dispersion state are not completely efficient in this respect. Thus, a certain amount of accumulation of solids and fouling of equipment takes place. In other instances, it is not economically practical to maintain the suspended solids in such dispersed state, and a more practical expedient is to periodically clean or redisperse the solids after fouling takes place.

For example, in so-called once-through cooling systems deposit formation readily occurs, and the equipment must be periodically cleaned. In these systems, if there is a plentiful supply of water in close proximity to an industrial plant, cooling is often accomplished in passing the water through heat transfer equipment and then discharging the water back to its source. Because of the large quantities of water that are employed in this system, it is not feasible from an economical standpoint to filter and/or treat the water in a conventional manner. For this reason, deposit formation normally occurs and it is ordinarily necessary to stop the unit at certain intervals for cleaning purposes.

Again, in the production of paper, solids such as titanium dioxide are deposited in a loosely adherent state throughout the paper mill equipment. Also, pitch that is found in white waters frequently is deposited throughout the mill equipment.

Another system faced with the problem of deposit formation is that of a ship ballast tank. These tanks used in ships such as in ore tankers that travel the Great Lakes, are filled during the return trip of the boat in order to adjust the level of the ship in the water. Water that is used to fill the tanks contains silt which rapidly accumulates in the tanks after several trips and adds significantly to the weight of the ships. Again, the tanks must be periodically cleaned of the silt by some means.

Another area wherein deposits must be redispersed occurs in the steel industry. In production of clinkers that are used in blast furnaces, large quantities of dust particles are formed. These particles are removed in a dust scrubber. The suspended solids frequently adhere to one another and form loose deposits in the scrubber equipment. Again, the units must be cleaned since the solids which deposit on the inner surfaces of the equipment obstruct the passage of air and reduce the vacuum and suction in the system.

Still other areas in which deposits occur and must be redispersed in some type of cleaning operation include the areas of dishwashers, felt cloth clean-up, industrial reactors, etc.

The above example illustrates a few of the situations wherein a need exists for an efficient process of redispersing into water loosely adherent deposits in contact with solid surfaces. If, for example, a chemical reagent could be developed which would aid in the redispersion process and which would be effective at low concentration levels, such agent would find ready acceptance in the art. Moreover, if such chemical treatment were adaptable to treatment of a wide variety of deposits upon various solid surfaces, such as wood or metal, such chemical would be a measurable advance in the art.

It is therefore an object of the present invention to provide a method of redispersing into aqueous systems deposits in contact with a wide variety of solid surfaces forming a part of said aqueous systems.

It is another object of the invention to provide a redispersing chemical which is effective at relatively low treatment levels, and is adaptable to use in operations such as cleaning ship ballast tanks, once-through cooling water systems, etc.

Other objects will become apparent to those skilled in the art from the following detailed description of the invention.

In general, the invention is based on the discovery that particular tertiary amino dicarboxylic acids or salts thereof have excellent activity in redispersing into water deposits in contact with solid surfaces forming a part of a wide variety of industrial operations. The redispersing agent acts in putting back into suspension loosely adherent deposits made up of nonbonded particulate matter in contact with solid surfaces forming a part of the above-described aqueous systems and others.

In its broadest aspect, the invention comprises treatment of said systems with a redispersing agent having the structural formula:

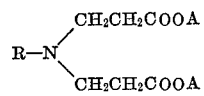

where R is a $C_{16}$–$C_{18}$ aliphatic hydrocarbon radical and A is a radical selected from the group consisting of hydrogen and alkali metal. The above class of chemicals may be in the free acid form, part acid-part salt form or be completely in the salt form. Most preferably, the redispersing agent contains a radical defined as R above which is derived from a tallow fatty acid. Thus, R may be either an unsaturated or saturated fatty acid radical or mixture thereof derived from such fatty acids as oleic, palmitic, stearic, etc. R is commonly mixed when derived from commercial sources of fatty acids such as animal tallow, vegetable tallow and the like.

The redispersing agents are generally effective in treatment dosages ranging from about 10 to 1000 p.p.m. and most preferably 10–300 p.p.m. The chemicals may be added in 100% active form or in the form of an aqueous solution or dispersion. The materials may also be applied to the systems under treatment via use of polar solvents such as alcohols, acetone, ethers, etc.

The chemicals when added to cooling waters used in once-through cooling water systems and other commercial operations employing water in some manner are capable of redispersing a wide variety of materials found as deposits in such systems. For example, the compositions are adaptable to redispersion of materials such as clays, quartz, iron oxides, titanium dioxide, etc. that are found in natural surface waters, in paper mill white waters, in cement slurries, in ceramic slips, etc., which particles particularly tend to accumulate and deposit upon solid surfaces.

The invention is adaptable to redispersing deposits found in contact with any number of solid surfaces regardless of the composition of the surface. However, the above-defined chemicals have found particular use in redispersing deposits which adhere to metal surfaces, such as those found in once-through cooling water systems and ship ballast tanks. It is not understood exactly how these materials aid in the cleaning operation, but it is believed that the treatment somehow conditions the deposits so that they are more amenable to redispersion with aid of flowing water.

It has been found that the defined chemicals are efficient regardless of the nature of the deposit. However, the chemical treatment is particularly effective in redispersing suspended matter occurring in natural surface waters such as quartz, calcite, kaolinite, organic matter, oxides of iron, illite and montmorillonite.

The following examples illustrate the effectiveness of the materials of the invention in redispersing deposits. Also, these examples illustrate the importance of the chemical structure and specificity of the treating reagent. Seemingly analogous or homologous materials have been found almost wholly inactive in aiding the redispersion process.

EXAMPLE I

In this test, two ballast tanks of a ship were cleaned with a composition of the invention. In some areas of the tanks mud depth ranged from 4 to 8 inches before treatment. Moreover, cross-over holes in the partitions within the tanks were partially obscured by mud before treatment. A treatment dosage of about 1100 p.p.m. of a 20% aqueous solution of the disodium salt of N-tallow beta-imino dipropionate adjusted to pH 7 was employed in the test.

The tanks were filled with roughly 250 tons of water and the cross-over pump started and operated continuously for approximately 4½ hours. It was reversed every 20 minutes, thus giving 13 changes of water or 6½ complete cycles. At the completion of the test, the tanks were opened and reinspected. The single treatment removed an estimated 22,100 pounds of mud for each of the tanks or a total of approximately 21.1 tons. Moreover, the cross-over holes in the partitions within the tanks were completely uncovered after the treatment. The chemical thus showed excellent activity in redispersing the mud or silt in the tanks, particularly in view of the severity of the problem of redispersion in this case.

EXAMPLE II

In this work, the chemicals of the invention were tested for effectiveness via the following test. This test was conducted by rotating an iron oxide coated screen in a beaker of chemically treated water for 24 hours at ambient temperature. The dry weight of the screen before and after treatment permitted calculation of the deposit removed.

More specifically, the screen was coated with the iron oxide by holding it for 3 minutes in a high speed blender containing 1000 p.p.m. of iron oxide suspended in tap water. The dry weight of the deposit was then determined. The screen was then immersed in tap water treated with the chemical of the invention and other chemicals similarly tested, and rotated for 24 hours at 160 r.p.m. The screen was then removed, dried and reweighed. The percent of deposit removed was determined as follows:

$$\frac{\text{Initial Weight} - \text{Final Weight}}{\text{Deposit Weight}} = \text{Percent Deposit Removed}$$

The weight of the deposits in each test screen when prepared in this manner generally ranged from 3.0 to 5.0 mgs. of iron oxide.

One of the chemicals falling within the scope of the invention, namely a solution of the disodium salt of N-tallow beta-imino-dipropionate, adjusted to pH 7 was run in the above test at various concentrations of active. Results were as follows:

Table I

| P.p.m. treatment: | Percent deposit removed |
|---|---|
| 25 | 84 |
| 75 | 97 |
| 100 | 96 |
| 125 | 98 |
| 250 | 99 |
| 500 | 100 |
| 1000 | 100 |

A number of seemingly homologous materials were also tested using the scheme outlined above. For example, the sodium salt of N-coco-beta-amino-propionate, at 1000 p.p.m., only removed 13% of the iron oxide deposit. Again, the disodium salt of N-lauryl-beta-imino-dipropionate, at a 1000 p.p.m. treatment level, only redispersed 20% of the deposit. Other known surfactant or detergent type materials, such as sodium toluene sulfonate and sodium oleate, at a 1000 p.p.m. treatment level, were completely inactive, and removed none of the deposit from the screen.

A number of other related materials were tested and found either completely inactive or vastly inferior to the compositions of the invention. Thus, it was surprising to note that only the specifically-defined materials herein possessed excellent activity in the redispersion process discussed above.

The compositions of the invention also demonstrated some activity in maintaining the redispersed solids in a suspended state. However, their primary role lies in the initial step of freeing the adherent solids from equipment surfaces.

The invention is hereby claimed as follows:

1. A process which comprises redispersing into aqueous systems loosely adherent deposits made up of non-bonded particulate matter in contact with solid surfaces forming a part of said systems by treatment of said systems with a redispersing agent having the structural formula:

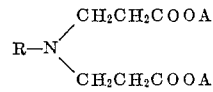

where R is a $C_{16}$–$C_{18}$ aliphatic hydrocarbon radical and A is a radical selected from the group consisting of hydrogen and alkali metal.

2. The process of claim 1 wherein R is a radical derived from a tallow fatty acid.

3. The process of claim 1 wherein said redispersing agent is added in an amount ranging from 10 to 1000 p.p.m.

4. A method of cleaning ship ballast tanks which comprises redispersing into water contained in said tanks loosely adherent deposits made up of non-bonded particulate matter in contact with the interior surface of said tanks by addition to said water of a redispersing agent having the structural formula:

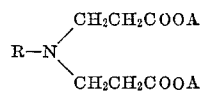

where R is a $C_{16}$–$C_{18}$ aliphatic hydrocarbon radical and A is a radical selected from the group consisting of hydrogen and alkali metal.

5. The method of claim 4 wherein R is a radical derived from a tallow fatty acid.

6. The method of claim 4 wherein said redispersing agent is added in an amount ranging from 10 to 1000 p.p.m.

7. A method of cleaning once-through cooling water systems which comprises redispersing into said systems loosely adherent deposits made up of non-bonded particulate matter in contact with the interior surfaces of said systems by addition to said cooling water of a redispersing agent having the structural formula:

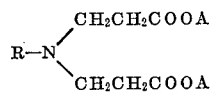

where R is a $C_{16}$–$C_{18}$ aliphatic hydrocarbon radical and A is a radical selected from the group consisting of hydrogen and alkali metal.

8. The method of claim 7 wherein R is a radical derived from a tallow fatty acid.

9. The method of claim 8 wherein said redispersing agent is added in an amount ranging from 10 to 1000 p.p.m.

References Cited

UNITED STATES PATENTS

| | | | |
|---|---|---|---|
| 2,240,957 | 6/1941 | Munz | 210—58 X |
| 2,894,905 | 7/1958 | Bernard | 210—58 |
| 3,005,734 | 10/1961 | Ells | 134—22 |
| 3,288,640 | 11/1966 | Flock | 134—22 |
| 3,296,027 | 1/1967 | Jacklin | 134—22 |

MORRIS O. WOLK, *Primary Examiner.*

SIDNEY MARANTZ, *Assistant Examiner.*

U.S. Cl. X.R.

210—58; 252—117, 152; 260—404, 534